(12) United States Patent
Stimm et al.

(10) Patent No.: US 12,425,533 B1
(45) Date of Patent: Sep. 23, 2025

(54) REDUCING NUMBER OF VIDEO FRAMING

(71) Applicant: GoPro, Inc., San Mateo, CA (US)

(72) Inventors: Daryl Stimm, Encinitas, CA (US);
Kyler William Schwartz, Oceanside, CA (US); Andrew Russell, San Francisco, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 18/743,541

(22) Filed: Jun. 14, 2024

Related U.S. Application Data

(60) Provisional application No. 63/521,005, filed on Jun. 14, 2023.

(51) Int. Cl.
*G11B 27/00* (2006.01)
*G11B 27/02* (2006.01)
*G11B 27/19* (2006.01)
*G11B 27/34* (2006.01)
*H04N 5/91* (2006.01)
*H04N 5/92* (2006.01)

(52) U.S. Cl.
CPC ............... *H04N 5/91* (2013.01); *G11B 27/19* (2013.01); *G11B 27/34* (2013.01)

(58) Field of Classification Search
CPC .......... H04N 5/92; G11B 27/19; G11B 27/34; G11B 27/02; G11B 27/00
USPC ................ 386/278, 280, 282, 290, 239, 248
See application file for complete search history.

(56) References Cited

U.S. PATENT DOCUMENTS

| | | | |
|---|---|---|---|
| 10,992,880 B1* | 4/2021 | Stimm | H04N 5/2628 |
| 11,200,918 B1* | 12/2021 | Corbin | G11B 27/34 |
| 11,282,547 B1* | 3/2022 | Fortunato | G11B 27/34 |
| 11,622,072 B2* | 4/2023 | Tran | H04N 23/698 |
| | | | 386/280 |

* cited by examiner

*Primary Examiner* — Daquan Zhao
(74) *Attorney, Agent, or Firm* — Esplin & Associates, PC

(57) ABSTRACT

Framings of a video determines which spatial extents of the video are presented during playback of the video. A viewing path for the video is generated based on the framings of the video, and the number of framings for the video is reduced based on the viewing path for the video. The reduced number of framings for the video is provided for use in generating a presentation of the video.

20 Claims, 7 Drawing Sheets

REDUCING NUMBER OF VIDEO FRAMING

FIELD

This disclosure relates to reducing the number of video framing using a viewing path for a video.

BACKGROUND

Framings of a video may determine which parts of the video is shown during playback. Having many framings of the video within a short duration may make management of the framings difficult and/or time consuming.

SUMMARY

This disclosure relates to reducing the number of video framing. Video information, framing information, and/or other information may be obtained. The video information may define a video. The video may include video content having a progress length. The video content may include visual content viewable as a function of progress through the progress length. The visual content may have a field of view. The framing information for the video may define a set of framing for the video. The set of framing for the video may include multiple framings of the visual content at multiple moments within the progress length. An individual framing of the visual content may define a positioning of a viewing window within the field of view of the visual content at a corresponding moment within the progress length. The viewing window may define extents of the visual content to be included within a presentation of the video.

A viewing path for the video may be generated based on the framing information and/or other information. The viewing path may define the positioning of the viewing window within the field of view of the visual content as the function of progress through the progress length. A reduced set of framing for the video may be generated based on the viewing path for the video and/or other information. The reduced set of framing for the video may include fewer number of framings of the visual content than the set of framing for the video. The reduced set of framing for the video may be provided for use in generating the presentation of the video.

A system for reducing the number of video framing may include one or more electronic storage, processor, and/or other components. The electronic storage may store video information, information relating to a video, framing information, information relating to framing for the video, information relating to a set of framing for the video, information relating to a viewing path for the video, information relating to a reduced set of framing for the video, information relating to a presentation of the video, and/or other information.

The processor(s) may be configured by machine-readable instructions. Executing the machine-readable instructions may cause the processor(s) to facilitate reducing the number of video framing. The machine-readable instructions may include one or more computer program components. The computer program components may include one or more of a video component, a framing component, a viewing path component, a reduced framing component, a provision component, and/or other computer program components.

The video component may be configured to obtain video information and/or other information. The video information may define a video. The video may include video content having a progress length. The video content may include visual content viewable as a function of progress through the progress length. The visual content may have a field of view. In some implementations, the video content may further include audio content.

The framing component may be configured to obtain framing information for the video and/or other information. The framing information may define a set of framing for the video. The set of framing for the video may include multiple framings of the visual content at multiple moments within the progress length. An individual framing of the visual content may define a positioning of a viewing window within the field of view of the visual content at a corresponding moment within the progress length. The viewing window may define extents of the visual content to be included within a presentation of the video.

In some implementations, the framing information for the video may be obtained based on a user's interaction with a mobile device and/or other information. In some implementations, the framing information for the video may be obtained based on tracking of a thing depicted within the visual content and/or other information. In some implementations, the framing information for the video may be obtained based on direction of the audio content and/or other information.

The viewing path component may be configured to generate a viewing path for the video. The viewing path for the video may be generated based on the framing information and/or other information. The viewing path may define the positioning of the viewing window within the field of view of the visual content as the function of progress through the progress length.

The reduced framing component may be configured to generate a reduced set of framing for the video. The reduced set of framing for the video may be generated based on the viewing path for the video and/or other information. The reduced set of framing for the video may include fewer number of framings of the visual content than the set of framing for the video.

In some implementations, generation of the reduced set of framing for the video based on the viewing path for the video may include: generation of a smoothed viewing path for the video from the viewing path for the video; and identification of points on the smoothed viewing path that define the smoothed viewing path; and generation of the reduced set of framing for the video based on the identified points on the smoothed viewing path that define the smoothed viewing path.

The provision component may be configured to provide the reduced set of framing for the video. The reduced set of framing for the video may be provided for use in generating the presentation of the video.

In some implementations, provision of the reduced set of framing for the video for use in generating the presentation of the video may include usage of the reduced set of framing for the video to generate the presentation of the video.

In some implementations, provision of the reduced set of framing for the video for use in generating the presentation of the video may include presentation of one or more graphical user interfaces on an electronic display. The graphical user interface(s) may include framing-marker elements to represent framings of the visual content within the reduced set of framing for the video. The framing-marker elements may be modifiable within the graphical user interface(s) to change the framings of the visual content within the reduced set of framing for the video. The graphical user interface(s) may further include a framing number element.

The framing number element may enable user control of a number of framing of the visual content within the reduced set of framing for the video.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
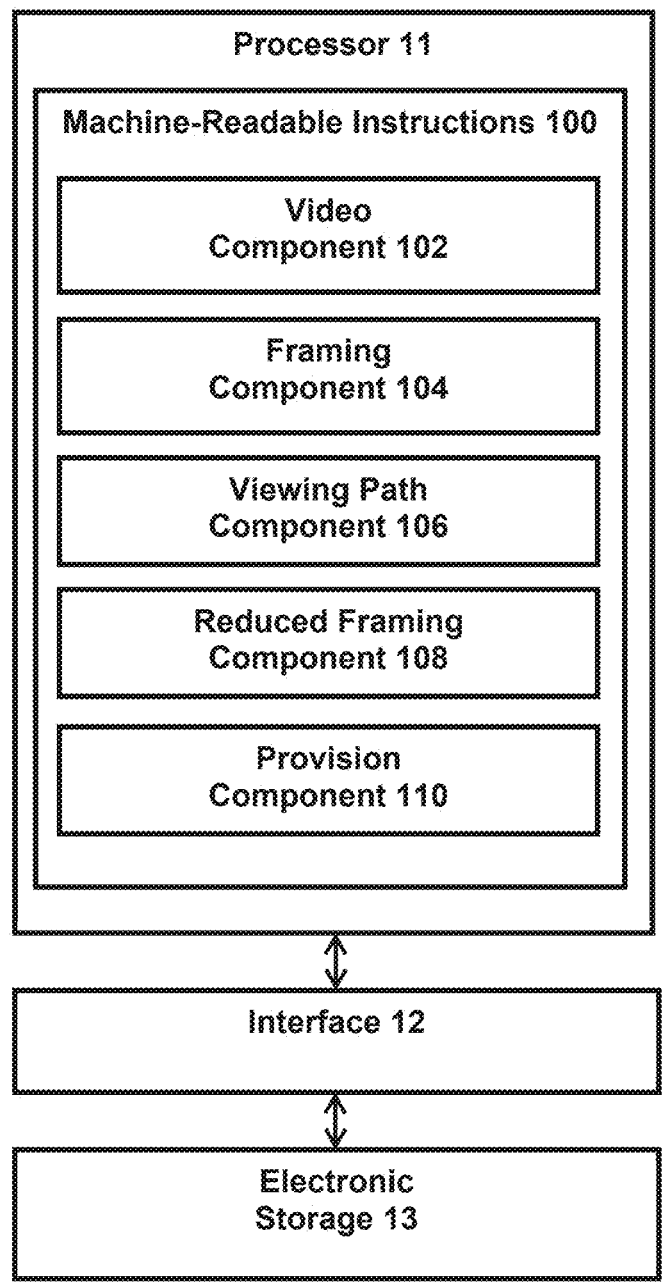
FIG. 1 illustrates a system for reducing the number of video framing.

FIG. 1 illustrates a system 10 for reducing the number of video framing. The system 10 may include one or more of a processor 11, an interface 12 (e.g., bus, wireless interface), an electronic storage 13, and/or other components. Video information, framing information, and/or other information may be obtained by the processor 11. The video information may define a video. The video may include video content having a progress length. The video content may include visual content viewable as a function of progress through the progress length. The visual content may have a field of view. The framing information for the video may define a set of framing for the video. The set of framing for the video may include multiple framings of the visual content at multiple moments within the progress length. An individual framing of the visual content may define a positioning of a viewing window within the field of view of the visual content at a corresponding moment within the progress length. The viewing window may define extents of the visual content to be included within a presentation of the video.

A viewing path for the video may be generated by the processor 11 based on the framing information and/or other information. The viewing path may define the positioning of the viewing window within the field of view of the visual content as the function of progress through the progress length. A reduced set of framing for the video may be generated by the processor 11 based on the viewing path for the video and/or other information. The reduced set of framing for the video may include fewer number of framings of the visual content than the set of framing for the video.

The reduced set of framing for the video may be provided by the processor 11 for use in generating the presentation of the video.

The electronic storage 13 may be configured to include one or more electronic storage media that electronically stores information. The electronic storage 13 may store software algorithms, information determined by the processor 11, information received remotely, and/or other information that enables the system 10 to function properly. For example, the electronic storage 13 may store video information, information relating to a video, framing information, information relating to framing for the video, information relating to a set of framing for the video, information relating to a viewing path for the video, information relating to a reduced set of framing for the video, information relating to a presentation of the video, and/or other information.

Content of one or more videos may be referred to as video content. Video content may have a progress length. That is, a video may include video content having a progress length. A progress length may be defined in terms of time durations and/or frame numbers. For example, video content of a video may have a time duration of 60 seconds. Video content of a video may have 1800 video frames. Video content having 1800 video frames may have a play time duration of 60 seconds when viewed at 30 frames per second. Other progress lengths, time durations, and frame numbers are contemplated.

Video content may include visual content, audio content, and/or other content. For example, video content may include visual content viewable as a function of progress through the progress length of the video content, audio content playable as a function of progress through the progress length of the video content, and/or other content that may be played back as a function of progress through the progress length of the video content.

Visual content may refer to content of image(s), video frame(s), and/or video(s) that may be consumed visually. For example, visual content may be included within one or more images and/or one or more video frames of a video. The video frame(s) may define/contain the visual content of the video. That is, video may include video frame(s) that define/contain the visual content of the video. Video frame(s) may define/contain visual content viewable as a function of progress through the progress length of the video content. A video frame may include an image of the video content at a moment within the progress length of the video. As used herein, the term video frame may be used to refer to one or more of an image frame, frame of pixels, encoded frame (e.g., I-frame, P-frame, B-frame), and/or other types of video frame. Visual content may be generated based on light received within a field of view of a single image sensor or within fields of view of multiple image sensors.

Visual content (of image(s), of video frame(s), of video(s)) with a field of view may be captured by an image capture device during a capture duration. A field of view of visual content may define a field of view of a scene captured within the visual content. A capture duration may be measured/defined in terms of time durations and/or frame numbers. For example, visual content may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated.

Visual content may be stored in one or more formats and/or one or more containers. A format may refer to one or more ways in which the information defining visual content is arranged/laid out (e.g., file format). A container may refer to one or more ways in which information defining visual content is arranged/laid out in association with other information (e.g., wrapper format). Information defining visual content (visual information) may be stored within a single file or multiple files. For example, visual information defining an image or video frames of a video may be stored within a single file (e.g., image file, video file), multiple files (e.g., multiple image files, multiple video files), a combination of different files, and/or other files. In some implementations, visual information may be stored within one or more visual tracks of a video.

Audio content may refer to media content that may be consumed as one or more sounds. Audio content may include one or more sounds stored in one or more formats/containers, and/or other audio content. Audio content may include one or more sounds captured by one or more sound sensors (e.g., microphone). Audio content may include audio/sound captured during the capture of the visual content and/or audio/sound provided as an accompaniment for the visual content. Audio content may include one or more of voices, activities, songs, music, and/or other audio/sounds. Audio content may include sounds captured by a single sound sensor or an array of sound sensors. The audio content may be captured by one or more sound sensors of the image capture device (e.g., microphone(s) of and/or coupled to the image capture device) and/or may be captured by one or more sound sensors separate from the image capture device (e.g., microphone(s) separate from the image capture device).

Audio content may be stored in one or more formats and/or one or more containers. Information defining audio content (audio information) may be stored within a single file or multiple files. For example, audio information defining sound recorded with frames of a video may be stored within a single file (e.g., audio file, video file), multiple files (e.g., multiple audio files, multiple video files), a combination of different files, and/or other files. Audio information may be stored with and/or separate from the video information. In some implementations, audio information may be stored within one or more audio tracks of a video.

Framing of the visual content of a video may determine which spatial extents of the visual content are presented during playback of the video. Framing of the visual content of a video may determine which spatial extents of the visual content are included within a punchout of the video for playback. The visual content of the video may be framed to control which spatial extents of the visual content are presented in playback of the original video and/or playback of one or more video edits including the video. A video edit may refer to a particular arrangement and/or manipulation of one or more segments of one or more videos. A video edit may include visual content, audio content, and/or other content of one or more videos. A video edit may include one or more unmodified segments of the video(s) and/or one or more modified segments of the video(s) (e.g., modified via applying of visual effects, audio effects, temporal effects).

Framing of the visual content may be set for multiple moments within the progress length of the video. Having too many framings in close temporal proximity may make management of the framings difficult and time consuming. For example, having too many framings within a duration of the video may make it difficult to present information about the framings to a user or require the user to make changes to many framings to create the desired punchout of the video.

The present disclosure provides improvements to video framing management by generating a viewing path for a video based on framings of the video. A fewer number of framings for the video is generated based on the viewing path for the video. The fewer number of framings for the video is provided for use in generating a presentation of the video.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate reducing the number of video framing. The machine-readable instructions 100 may include one or more computer program components. The machine-readable instructions 100 may include one or more of a video component 102, a framing component 104, a viewing path component 106, a reduced framing component 108, a provision component 110, and/or other computer program components.

The video component 102 may be configured to obtain video information and/or other information. Obtaining video information may include one or more of accessing, acquiring, analyzing, determining, examining, generating, identifying, loading, locating, opening, receiving, retrieving, reviewing, selecting, storing, and/or otherwise obtaining the video information. The video component 102 may obtain video information from one or more locations. For example, the video component 102 may obtain video information from a storage location, such as the electronic storage 13, electronic storage of information and/or signals generated by one or more sensors, electronic storage of a device accessible via a network, and/or other locations. The video component 102 may obtain video information from one or more hardware components (e.g., an image sensor) and/or one or more software components (e.g., software running on a computing device).

In some implementations, the video component 102 may obtain video information based on user interaction with a user interface/application (e.g., video editing application, video player application), and/or other information. For example, a user interface/application may provide option(s) for a user for video framing or to generate a video edit. The video information defining a video may be obtained based on the user's selection of the video through the user interface/video application for use in video framing or generating a video edit. Other selections of video for retrieval of video information are contemplated.

The video information may define a video. The video may have a progress length (e.g., duration). The video may include video content, audio content, and/or other content having the progress length. The video content may include visual content, audio content, and/or other content viewable/playable as a function of progress through the progress length.

The video information may define a video by including information that defines one or more content, qualities, attributes, features, and/or other aspects of the video/video content. For example, the video information may define a video by including information that makes up the content of the video and/or information that is used to determine the content of the video. For instance, the video information may include information that makes up and/or is used to determine the arrangement of pixels, characteristics of pixels, values of pixels, and/or other aspects of pixels that define visual content of the video. The video information may include information that makes up and/or is used to determine audio content and/or other content of the video. Other types of video information are contemplated.

The visual content of the video may have a field of view. The field of view of the visual content may refer to a portion of a scene that was observed by one or more image capture devices in capturing the visual content. The field of view may refer to the extent (e.g., angle, size) of a scene that is captured within the visual content. A scene may refer to a place and/or a location in which the image capture device is located while capturing visual content. A scene may include one or more portions of a place and/or a location at which the image capture device is directed during capture of the visual content. A scene may include one or more portions of a place and/or a location that are within the field of view of the image capture device during capture of the visual content. A scene may include static things (e.g., environment, non-moving objects) and/or dynamic things (e.g., moving objects).

In some implementations, the video may include a spherical video. The field of view of the visual content of a spherical video may include a spherical field of view. Spherical field of view may include full spherical field of view (360 degrees of capture) or partial spherical field of view (less than 360 degrees of capture). The visual content may be viewable from a point of view as the function of progress through the progress length. Spherical video content may include and/or may be associated with spatial sounds.

The video information may be stored within a single file or multiple files. For example, video information defining a video may be stored within a video file, multiple video files, a combination of different files (e.g., a visual file and an audio file), and/or other files. Video information may be stored in one or more formats or containers. A format may refer to one or more ways in which the information defining a video is arranged/laid out (e.g., file format). A container may refer to one or more ways in which information defining a video is arranged/laid out in association with other information (e.g., wrapper format).

The framing component 104 may be configured to obtain framing information for the video and/or other information. Obtaining framing information may include one or more of accessing, acquiring, analyzing, determining, examining, generating, identifying, loading, locating, opening, receiving, retrieving, reviewing, selecting, storing, and/or otherwise obtaining the framing information. The framing information component 104 may obtain framing information from one or more locations. For example, the framing information component 104 may obtain framing information from a storage location, such as the electronic storage 13, electronic storage of a device accessible via a network, and/or other locations. The framing information component 104 may obtain framing information from one or more hardware components (e.g., computing device, electronic storage, mobile device) and/or one or more software components (e.g., software running on a computing device, software running on a mobile device). Framing information may be stored within a single file or multiple files.

In some implementations, the framing information component 104 may obtain framing information based on a user's interaction with a user interface/application (e.g., video editing application, video player application), and/or other information. The user interface/application may provide option(s) for a user to set and/or define one or more framings of the visual content. For example, the user interface/application may enable the user to select individual moments within the progress length to specify a framing of the visual content, and enable the user to set one or more of the viewing direction, the viewing size, the viewing rotation, the viewing projection, and/or other information to define the individual framings of the visual content at the selected moments.

In some implementations, the framing information may be associated with a particular video, and the framing information may be obtained based on the particular video being obtained. In some implementations, the framing information may be included within metadata of the obtained video, and the framing information may be obtained based on obtaining (e.g., selection, retrieval) of the video. The framing information may be included within the video information, and the framing information component 104 may obtain framing information by extracting the framing information from the video information.

The framing information may define a set of framing for the video. The set of framing for the video may include multiple framings of the visual content at multiple moments within the progress length. The set of framing for the video may include same or different framings of the visual content at different moments within the progress length.

The framing information may define a set of framing for a video by including information that defines one or more content, qualities, attributes, features, and/or other aspects of the set of framing for the video. For example, the framing information may define a set of framing for a video by including information that describes, defines, and/or otherwise characterizes framings of the visual content at moments within the progress length. The framing information may include information that makes up and/or is used to determine framings of the visual content at moments within the progress length. Other types of framing information are contemplated.

An individual framing of the visual content may define a positioning of a viewing window within the field of view of the visual content at a corresponding moment within the progress length. The viewing window may define extents of the visual content to be included within a presentation of the video. A moment within the progress length may include a point (e.g., a point in time, a video frame) or a duration (e.g., a duration of time, a grouping of adjacent video frames) within the progress length.

The positioning of the viewing window within the field of view of the visual content may refer to placement of the viewing window within the field of view of the visual content. The positioning of the viewing window may be defined by one or more of viewing direction, viewing size, viewing rotation, and/or other information. An individual framing of the visual content may define which pixels of the video frames will be included in presentation of the video. The arrangement of the pixels within the viewing window may be defined based on viewing projection and/or other information. That is, an individual framing of the visual content may further define corresponding viewing projection of the visual content within the viewing window.

The positioning of a viewing window within the field of view of the visual content may be effectuated through movement (translational movement, rotational movement) of the viewing window with respect to the field of view of the visual content and/or through movement of the field of view of the visual content (e.g., movement of the visual content in the image space). The positioning/placement of the viewing window may determine framing of the visual content. In some implementations, direction, shape, size, projection, and/or other characteristics of the viewing window may be selected to determine the framing of the visual content. The characteristics of the viewing window may determine how the extent of the visual content within the viewing window is framed for presentation. For example, an individual framing of the visual content may define the positioning of the viewing window within the field of view of the visual content based on a viewing direction of the viewing window, a viewing size of the viewing window, and/or other information. The individual framing of the visual content may further define the positioning of the viewing window within the field of view of the visual content based on a viewing rotation of the viewing window, a viewing projection of the viewing window, and/or other information.

A viewing direction may define a direction of view for visual content. A viewing direction may define the angle/visual portion of the visual content at which the viewing window may be directed. Changes in the viewing direction as the function of progress through the progress length may effectuate movement (e.g., panning) of the viewing window within the field of view of the visual content.

A viewing size may define a size of the viewing window. A viewing size may define a size (e.g., size, magnification, viewing angle) of viewable extents of visual content. A viewing size may define the dimensions of the viewing window. In some implementations, a viewing size may define different shapes of the viewing window/viewable extents. For example, a viewing window may be shaped as a rectangle, a triangle, a circle, and/or other shapes. A viewing size may define different aspect ratios of the viewing window (e.g., 4:3 aspect ratio, 16:9 aspect ratio, 1:1 aspect ratio). Changes in the viewing size (sizes of the viewing window) as the function of progress through the progress length may simulate changes in zoom of the visual content. The viewing size may be increased to simulate decrease in zoom of the visual content. The viewing size may be decreased to simulate increase in zoom of the visual content.

A viewing rotation may define a rotation of the viewing window. A viewing rotation may define one or more rotations of the viewing window about one or more axis. For example, a viewing rotation may be defined based on rotation about an axis corresponding to a viewing direction (e.g., roll). Changes in the viewing rotation as the function of progress through the progress length may effectuate rotation of the viewing window within the field of view of the visual content. The viewing window may be rotated to compensate for rotation of the image capture device during capture duration. The viewing window may be rotated to provide a tilted view of the visual content.

The viewing window may be used to provide a punchout of the visual content. A punchout of the visual content may refer to an output of one or more portions of the visual content for presentation (e.g., current presentation, future presentation based on video generated using the punchout). A punchout of the visual content may refer to extents of the visual content that is obtained for viewing and/or extraction. The extents of the visual content viewable/extracted within the viewing window may be used to provide views of different spatial portions of the visual content. For example, the visual content may include a field of view, and the punchout of the visual content may include the entire extent of the visual content (the visual content within the entire field of view) or one or more extents of the visual content (the visual content within one or more portions of the field of view.

Figure 3A:
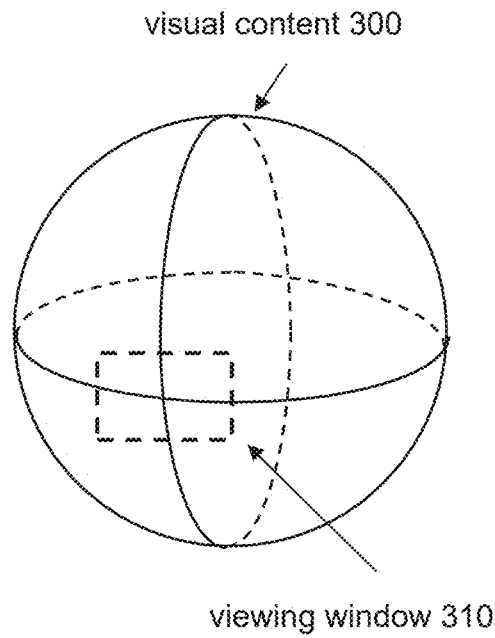
FIG. 3A illustrate an example framing of visual content.
Figure 3B:
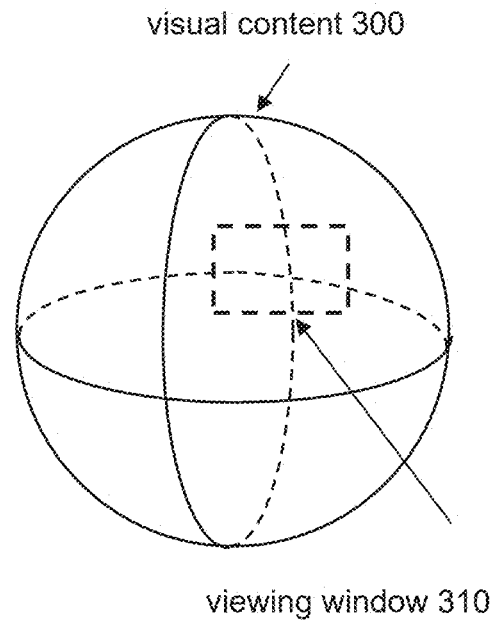
FIG. 3B illustrate an example framing of visual content.
Figure 3C:
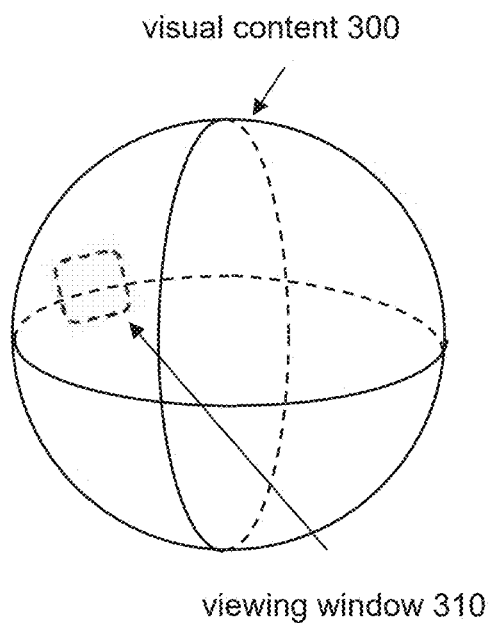
FIG. 3C illustrate an example framing of visual content.

For example, FIGS. 3A, 3B, and 3C illustrate different framings of visual content 300 at different moments within the progress length of the visual content 300. For instance, the visual content 300 may include visual content of a video, and FIGS. 3A, 3B, and 3C may illustrate the visual content 300 within different video frames of the video (content of the video frames at different moments within the progress length). For example, as shown in FIG. 3A, a framing of the visual content 300 at a first moment within the progress length may include a viewing window 310 being positioned at the front of the visual content 300 and being leveled within the visual content 300. As shown in FIG. 3B, a framing of the visual content 300 at a second moment (subsequent to the first moment) within the progress length may include the viewing window 310 being positioned at the back of the visual content 300 and being leveled within the visual content 300. As shown in FIG. 3C, a framing of the visual content 300 at a third moment (subsequent to the second moment) within the progress length may include the viewing window 310 being positioned at front-upper-right of the visual content 300. The framing of the visual content 300 at the third moment may include the viewing window 310 being tilted and having a different dimension (e.g., different shape, smaller size) than the framing of the visual content at the first moment and the second moment. Other framings of the visual content are contemplated.

In some implementations, at least one of the multiple framings may include a moment-to-duration framing. A moment-to-duration framing may refer to a framing that changes the progress length of the video/visual content. For example, a moment-to-duration framing may extend a moment (e.g., point in time, duration of time) within the progress length to a duration longer than the moment within the progress length/presentation of the video content. For example, a moment-to-duration framing may include visual content at a point within the progress length that has been duplicated over a duration longer than the point. For instance, a video frame corresponding to the moment-to-duration framing may be duplicated into multiple video frames so that the same video frame is presented during the duration corresponding to the moment-to-duration framing.

As another example, a moment-to-duration framing may include a video segment with the playback rate and/or playback direction defined by the moment-to-duration framing. For instance, video frames corresponding to the moment-to-duration framing may be played back at a playback rate different (e.g., faster, slower) than the normal playback rate (1× speed) and/or the order/direction in which the video frames are presented may be changed (e.g., forward playback direction, reverse playback direction).

A moment-to-duration framing may include multiple sub-framings within the duration of the moment-to-duration framing. A sub-framing may refer to a framing within the duration of the moment-to-duration framing. The multiple sub-framings within the duration may enable different portions of the visual content corresponding to the duration to be included within a presentation of the visual content. For example, for a moment-to-duration framing may extend a moment (e.g., point in time, duration of time) within the progress length to a duration longer than the moment within the progress length/presentation of the video content, and multiple sub-framings may simulate the video being paused for the duration and different portions of the visual content being presented while the video is paused.

Figure 3D:
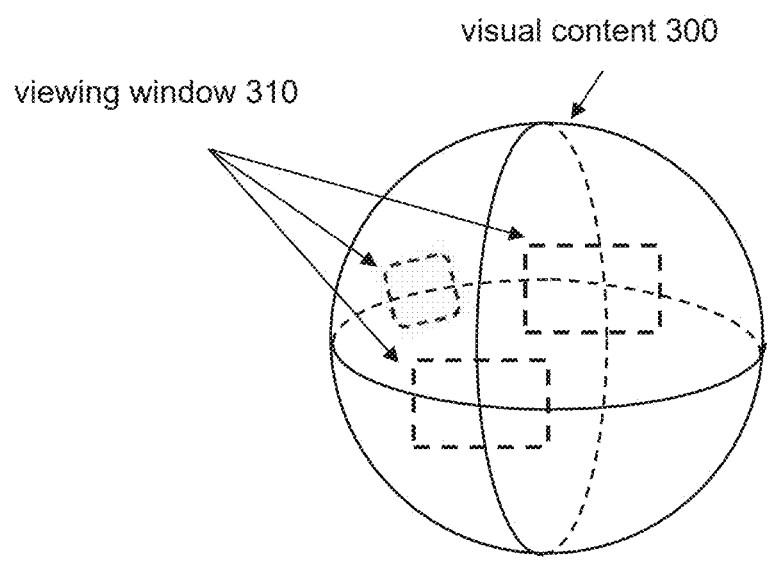
FIG. 3D illustrate example framings of visual content.

FIG. 3D illustrate an example moment-to-duration framing of visual content 300. The visual content 300 may correspond to visual content of a video at a moment (e.g., a point in time) within the progress length of the video. For example, the visual content 300 may be visual content of a video frame within the video. The moment-to-duration framing of the visual content 300 may extend the moment within the progress length to a duration longer than the moment within the progress length/presentation of the video content. The moment-to-duration framing of the visual content 300 may include the visual content 300 being duplicated over the duration (the video frame being duplicated to extend the duration) so that the presentation of the video appears to be paused during playback of the duration. The moment-to-duration framing of the visual content 300 may include multiple sub-framings within the duration. For example, as shown in FIG. 3, the moment-to-duration framing of the visual content 300 may include three sub-framings within the duration. For instance, the multiple sub-framings of the visual content 300 may include the viewing window 310 being positioned (1) at the front of the visual content 300 and being leveled within the visual content 300 at the beginning of the duration, (2) at the back of the visual content 300 and being leveled within the visual content 300 within the duration (e.g., at the mid-point, at non-midpoint), and (3) at front-upper-right of the visual content 300 and being tiled and having a different dimension at the end of the duration. Other sub-framings of the visual content are contemplated.

In some implementations, the framing information for the video may be obtained based on a user's interaction with a mobile device and/or other information. A mobile device may refer to a portable computing device. A mobile device may refer to a computing device that is small enough to be held and operated in a hand, such as a smartphone and/or a tablet. Other mobile devices are contemplated. The mobile device may include one or more electronic displays. In some implementations, one or more electronic displays of the mobile device may include touchscreen display(s). The mobile device may provide a presentation of the visual content of the video on one or more electronic displays. The mobile device may provide a presentation of the extents of visual content defined by the viewing window on the electronic display(s). The extents of the visual content defined by the viewing window may be presented on the electronic display(s) to facilitate the user's interaction with the mobile device to determine the framing information (to set the framing of the visual content). As the user interacts with the mobile device to change the framing of the visual content, the selected framing of the visual content may be presented on the electronic display(s), allowing the user to see how the visual content will be framed during playback.

A user may interact with the mobile device to determine the framing information. The user may act on the mobile device and/or operate the mobile device in one or more ways to determine the framing information. A user interacting with the mobile device may include the user interacting with one or more buttons (e.g., physical buttons, virtual buttons presented on an electronic display) of the mobile device and/or the user changing the orientation of the mobile device. The mobile device may include one or more positions sensors (e.g., inertial measurement unit, accelerometer, gyroscope, magnetometer) to measure the orientation of the mobile device.

A user may interact with the mobile device to specify one or more framings of the visual content at one or more moments within the progress length of the video. For example, a user may interact with the mobile device to select moments within the progress length to specify framings of the visual content at the corresponding moments. The user may specify the framings of the visual content by setting one or more characteristics of the viewing window at the corresponding moments. For example, the user may interact with the mobile device to set, for a corresponding moment within the progress length, one or more of the viewing direction, the viewing size, the viewing rotation, the viewing projection, and/or other information to define the framing of the visual content.

A user may control the orientation of the mobile device to set the viewing direction and/or the viewing rotation of one or more framings. The user may change the orientation (rotational position) of the mobile device (e.g., with respect to ground) to change the viewing direction. That is, the user may rotate the mobile device to change the direction in which the viewing window is pointed/located within the field of view of the visual content to look at different extents of the visual content. For instance, the user may rotate the mobile device about the yaw axis and/or the pitch axis to change the viewing direction for the visual content in the direction of rotation (e.g., rotating to the right, left, pitch-up, pitch-down). The user may rotate the mobile device (e.g., tilt to right, left) to change the viewing rotation for the video content.

The position sensor(s) of the mobile device may record the orientation/changes in orientation of the mobile device and store them as orientation information of the mobile device. The orientation information may characterize orientation of the mobile device as a function of the progress length of the video, which may be used to determine the viewing direction and/or the viewing rotation of the viewing window as the function of the progress length of the video. In some implementations, the framing information may characterize the viewing direction and/or the viewing rotation based on the framing information including orientation information of the mobile device.

Thus, the user may move the mobile device as a control device to perform 3D spatial navigation of the visual content. The user may orient the mobile device in different positions within the real world to see different extents of the visual content. The user may explore the visual content in both space (different extents of the visual content) and time (different moments within the progress length) to determine framings of the visual content at different moments within the progress length of the video. Such determinations of video framing may be more intuitive and natural than traditional video framing using video editing applications, where the position of the electronic display remains static and different extents of the visual content are explored via user command received through mouse/keyboard.

A user may control zoom of the viewing window to set the viewing size. For example, the mobile device may include physical buttons mapped to zoom-in and zoom-out operations, and the user may press the corresponding physical buttons to decrease/increase the viewing size. The mobile device may include a touchscreen display, which presents virtual buttons mapped to zoom-in and zoom-out operations, and the user may press the corresponding virtual buttons to decrease/increase the viewing size. The mobile device may include a touchscreen display, and the zooming operation may be controlled by the user based on the user making a stretching gesture (e.g., zoom in) and/or a pinching gesture (e.g., zoom out) on the touchscreen display to decrease/increase the viewing size. The zooming operation of the mobile device may be tied to its location (e.g., translational location), and the zooming operation of the mobile device may be controlled by the user based on the use moving the mobile device forward (e.g., zoom in) or backward (e.g., zoom out) to decrease/increase the viewing size.

The user may interact with the mobile device to continuously set the framings of visual content and/or to set the framings of visual content at non-adjacent moments within the progress length. For example, the user may interact with the mobile device (e.g., press a "record" button) to start "recording" the framings of visual content using the mobile device. After the "recording" has started, the orientation information of the mobile device may be stored to define the viewing direction and/or the viewing rotation of the viewing window at a particular rate. Such setting of the framings may enable a user to move the mobile device to "record" desired views of the visual content while the visual content is being played. The user may position the mobile device at different orientations, and the changes in the orientations of the mobile device may be recorded at the particular rate to provide framings of the visual content at different moments.

In some implementations, the framing information for the video may be obtained based on tracking of a thing depicted within the visual content and/or other information. A thing depicted within the visual content may refer to an object captured within the visual content. A thing depicted within the visual content may include a living thing or a non-living thing. The thing depicted within the visual content may be selected for use in determining the framings of the visual content. The thing depicted within the visual content may be selected manually (e.g., by a user) or automatically (e.g., by a computing device/video editing engine). The framings of the visual content may be determined based on tracking of the thing to include with the depiction of the thing within the framings (within the viewing window). The viewing window may be positioned so that the depiction of the thing is included within the viewing window. The framings of the visual content may be determined to include a stabilized depiction of the thing. Other framings of the visual content based on the depiction of thing(s) within the visual content are contemplated.

In some implementations, the framing information for the video may be obtained based on direction of the audio content and/or other information. The direction of the audio content may refer to the direction of sound captured within the audio content. The direction of the audio content may refer to the direction from which the sound in the audio content traveled when the sound was captured. The direction of the audio content may refer to the source direction of sounds captured within the audio content. The framings of the visual content may be determined based on the direction of the audio content to include the direction of the audio content (within the viewing window). The viewing window may be positioned so that the direction from which the sound traveled is included within the viewing window. Other framings of the visual content based on the audio content are contemplated.

Figure 4A:
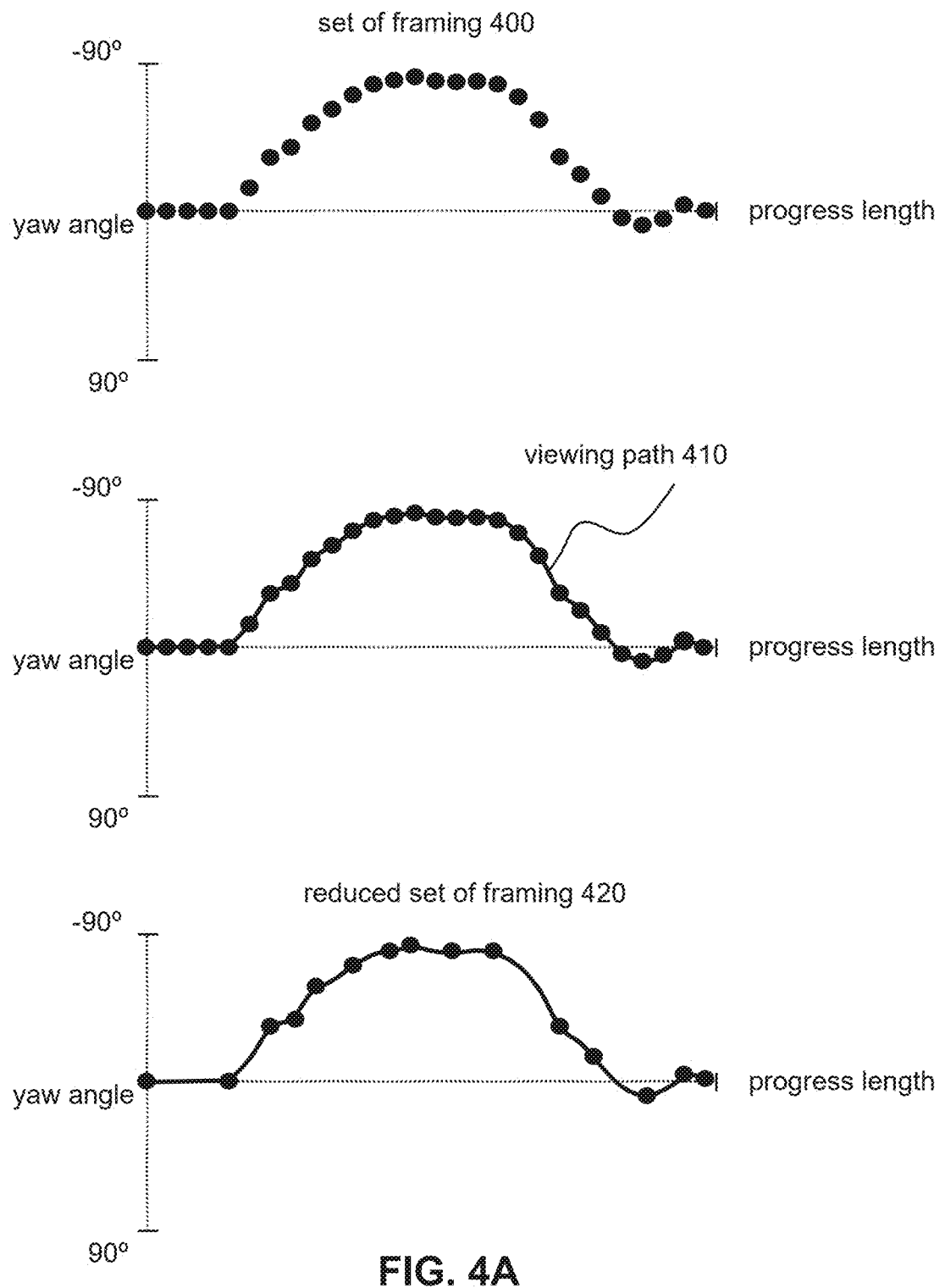
FIG. 4A illustrates examples of a set of framing, a viewing path, and a reduced set of framing.

FIG. 4A illustrates an example set of framing 400. The set of framing 400 may include separate framings of visual content of a video at separate moments within the progress length of the video. For example, the set of framing 400 may define positioning of a viewing window within the field of view of the visual content. For instance, the set of framing 400 may define rotation of the viewing window about a yaw axis. The set of framing 400 may include dense framings.

The set of framing 400 may include framings of the visual content that are closely compacted in time. The denseness of the framings may make management of the framings difficult and time consuming. For example, presenting all the framings within the set of framing 400 within a graphical user interface may crowd the graphical user interface. The denseness of the framings may make it hard to distinguish between individual visual representations of the framings within the graphical user interface. As another example, a user may need to change many adjacent framings within the set of framing 400 to create a sustained change in the presentation of the visual content. For instance, changing only a single or a few framings within the set of framing 400 may result in the viewing window's positioning being changed just momentarily before switching back to the original positioning within the set of framing 400.

The viewing path component 106 may be configured to generate a viewing path for the video. Generating a viewing path for the video may include ascertaining, approximating, calculating, determining, estimating, finding, identifying, obtaining, setting, and/or otherwise generating the viewing path for the video. The viewing path for the video may be generated based on the framing information and/or other information. The viewing path for the video may be generated based on the set of framing for the video and/or other information. The viewing path for the video may be generated based on multiple framings of the visual content at multiple moments within the progress length of the video. The viewing path for the video may be generated to include and/or pass through the set of framing for the video. The viewing path for the video may be generated to include and/or pass through some or all of the multiple framings of the visual content at multiple moments within the progress length of the video.

A viewing path may refer to a path or a progression of the positioning of the viewing window within the field of view of the visual content as the function of progress through the progress length. A viewing path may define the positioning of the viewing window within the field of view of the visual content as the function of progress through the progress length. A viewing path may define one or more of viewing direction, viewing size, viewing rotation, viewing projection, and/or other information to define the positioning of the viewing window within the field of view of the visual content.

The positioning of the viewing window defined by the viewing path may include the positioning of the viewing window defined by the set of framing/multiple framings of the visual content. Different framings of the visual content at different moments within the process length may dictate the positioning of the viewing window defined by the viewing path. Different framings of the visual content at different moments within the process length may define fixed positionings of the viewing window within the viewing path. The viewing path component 106 may generate the viewing path to include the fixed positionings of the viewing window within the viewing path. The viewing path component 106 may generate the viewing path to include changes in the positioning of the viewing window between the fixed positionings of the viewing window within the viewing path. The viewing path may include interpolated positioning of the viewing window. For example, the viewing path may include interpolated viewing directions, interpolated viewing size, interpolated viewing rotation, and/or interpolated viewing projection determined based on the viewing directions, the viewing size, the viewing rotation, and/or the viewing projection of the multiple framings in the set of framing.

For example, referring to FIG. 4A, a viewing path 410 may be generated based on the set of framing 400 and/or other information. The viewing path 410 may be generated to include and/or pass through the multiple framings within the set of framing 400. The viewing path 410 may include a curve that runs through the multiple framings within the set of framing 400. The viewing path 410 may be generated via curve fitting of the multiple framings within the set of framing 400. Other generations of viewing path are contemplated.

The reduced framing component 108 may be configured to generate a reduced set of framing for the video. Generating a reduced set of framing for the video may include ascertaining, approximating, calculating, determining, estimating, finding, identifying, obtaining, setting, and/or otherwise generating the reduced set of framing for the video. The reduced set of framing for the video may be generated based on the viewing path for the video and/or other information. The reduced set of framing for the video may be generated based on the positioning of the viewing window defined by the viewing path and/or other information. The reduced set of framing for the video may include fewer number of framings of the visual content than the set of framing for the video. The reduced set of framing for the video may be generated based on the viewing path for the video to include fewer number of framings than the set of framing for the video.

The reduced set of framing for the video including fewer number of framings than the set of framing for the video may include the reduced set of framing for the video including less framings than the of framings for the video. The reduced set of framing for the video including fewer number of framings than the set of framing for the video may include the reduced set of framing being less dense/more sparse than the set of framing. The reduced set of framing for the video including fewer number of framings than the set of framing for the video may include the framings in the reduced set of framing being spaced apart more (e.g., in time) than the framings in the set of framing. The reduced set of framing for the video including fewer number of framings than the set of framing for the video may include the frequency of framing being reduced in the reduced set of framing. For example, rather than having tens, hundreds, or thousands of framings per every second of the video, the framings may be reduced to include one or tens of framings per minute of the video. Other reduction in the number of framings is contemplated.

In some implementations, generation of the reduced set of framing for the video based on the viewing path for the video may include: identification of points on the viewing path that define the viewing path; and generation of the reduced set of framing for the video based on the identified points on the viewing path that define the viewing path. Points that define the viewing path may refer to points on the viewing path that are needed to determine or identify the characteristics or qualities of the viewing path. Points that define the viewing path may refer to points that are needed to define the curvature of the viewing path. For example, points that define the viewing path may include the starting point, the ending point, minimum point(s), maximum point(s), inflection point(s), and/or other points. The identified points may reduce the amount of data needed to define the viewing path. For example, rather than storing the curve of the viewing path, the identified points for the viewing path may be stored.

The reduced set of framing may be generated to include a framing for individual identified points on the viewing path. The reduced set of framing may be generated to include the framing/positioning of the viewing window at the individual identified points on the viewing path. Such generation of the reduced set of framing may result in the framings being generated based on changes in the positioning of the viewing window. Higher number of framings may be generated for greater changes in the positioning of the viewing window along the viewing path and lower number of framings may be generated for smaller/no changes in the positioning of the viewing window along the viewing path.

For example, referring to FIG. 4A, a reduced set of framing 420 may be generated based on the viewing path 410 and/or other information. The reduced set of framing 420 may be generated based on the positioning of the viewing window defined by the viewing path 410 and/or other information. The reduced set of framing 420 may include fewer number of framings of the visual content than the set of framing 400. The reduced set of framing 420 may be generated based on the viewing path 410 to include fewer number of framings than the set of framing 400.

The reduced set of framing 420 may be generated by identifying the points along the viewing path 410 that define the viewing path 410. The reduced set of framing 420 may include/define the positioning of the viewing window within the field of view of the visual content for the moments in which the points are identified for the viewing path 410.

In some implementations, generation of the reduced set of framing for the video based on the viewing path for the video may include: generation of a smoothed viewing path for the video from the viewing path for the video; and identification of points on the smoothed viewing path that define the smoothed viewing path; and generation of the reduced set of framing for the video based on the identified points on the smoothed viewing path that define the smoothed viewing path. Before points are identified, the viewing path may be smoothed. Smoothing the viewing path may include removing high frequency changes from the viewing path. Smoothing the viewing path may reduce/remove jitters and/or shakes from the viewing path. Smoothing the viewing path may smooth the changes in the positioning of the viewing window defined by the viewing path (e.g., smooth changes in viewing direction, viewing size, viewing rotation, viewing projection). Smoothing the viewing path before the identification of the points that define the viewing path may reduce the number of points that are identified.

Figure 4B:
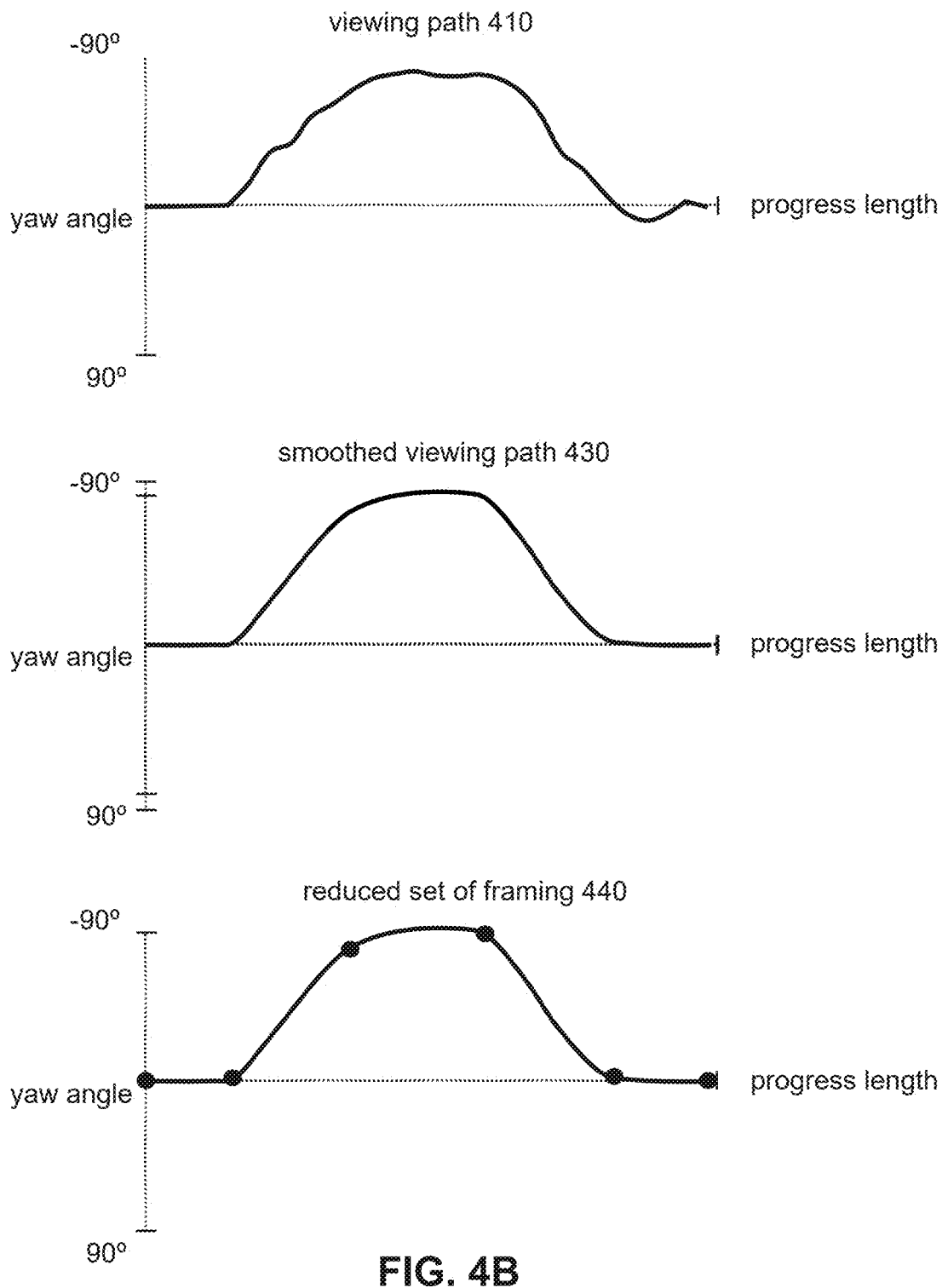
FIG. 4B illustrates examples of a set of framing, a viewing path, and a reduced set of framing.

FIG. 4B illustrates an example reduction in framing number via smoothing of the viewing path 410. The viewing path 410 may be smoothed to generate a smoothed viewing path 430. Points that define the smoothed viewing path 430, rather than the viewing path 410, may be identified. The reduced set of framing 440 may include/define the positioning of the viewing window within the field of view of the visual content for the moments in which the points are identified for the smoothed viewing path 430.

The provision component 110 may be configured to provide the reduced set of framing for the video. The reduced set of framing for the video may be provided for use in generating the presentation of the video. Generating the presentation of the video may include determining which spatial extent of the visual content are included in the presentation based on the reduced set of framing for the video. The presentation of the video may include the spatial extents of the visual content within the viewing window corresponding to the reduced set of framing for the video. The presentation of the video may include the spatial extents of the visual content within the viewing window corresponding to the viewing path/smoothed viewing path defined by the reduced set of framing for the video. For example, the viewing path/smoothed viewing path may be generated based on the framings included in the reduced set of framing for the video, and the presentation of the video may be generated based on the viewing path/smoothed viewing path.

The presentation of the video may be generated for current presentation and/or future presentation based on video generated using the punchout. For example, generating the presentation of the video may include displaying the spatial extents of the visual content within the viewing window on one or more electronic displays. Generating the presentation of the video may include generating one or more video files that include the spatial extents of the visual content within the viewing window. For example, the spatial extents of the visual content within the viewing window may be used to generate a two-dimensional video from a spherical video. Other generations of the presentation of the video are contemplated.

Providing the reduced set of framing for the video for use in generating the presentation of the video may include one or more of sending, supplying, interpreting, making available, offering, and/or otherwise providing the reduced set of framing for the video for use in generating the presentation of the video. For example, providing the reduced set of framing for the video for use in generating the presentation of the video may include one or more of supplying the reduced set of framing for use in generating the presentation, making the reduced set of framing available for generating the presentation, indicating the reduced set of framing available for generating the presentation, presenting the reduced set of framing for user selection/non-selection in generating the presentation, using the reduced set of framing to generate the presentation, and/or otherwise providing the reduced set of framing for use in generating the presentation of the video. For instance, provision of the reduced set of framing for the video for use in generating the presentation of the video may include usage of the reduced set of framing for the video to generate the presentation of the video.

For example, the reduced set of framing may be provided to a computing device, software (e.g., video editing application), and/or user for use in generating the presentation of the video. The reduced set of framing may be made available to a computing device, software, and/or user for generating the presentation. Which sets of framing/reduced sets of framing are available for generating the presentation may be indicated to a computing device, software, and/or user. The reduced set of framing may be presented on one or more user interfaces for user selection, non-selection, and/or modification of framings in generating the presentation.

A video editing application may refer to an application (software, program, tool, plugin) that enables a user to edit a video. A video editing application may provide one or more options to edit a video, such as options to determine which spatial and/or temporal portions of the video are to be included within a video edit, options to determine the order in which the selected spatial and/or temporal portions are to be included within the video edit, and/or options to determine which effects (e.g., visual effects, audio effects) are to be included within the video edit. For instance, a video editing application may provide one or more options to edit a spherical video.

The reduced set of framing may be provided to the video editing application for use in providing preliminary framings of the visual content at the corresponding moments within the progress length. The video editing application may utilize the reduced set of framing to provide preliminary framings of the visual content at the corresponding moments within the progress length. Preliminary framings of the visual content may refer to framings of the visual content that are initially presented to the user by the video editing application. For example, the video editing application may use the framings of the visual content in the reduced set of framing to provide framings of the visual content within the video edit. The video editing application may provide visual representation of the reduced set of framing, such as by providing preview of the framings in the reduced set of framing. The video editing application may enable a user to add, remove, and/or change framings of the visual content.

In some implementations, the reduced set of framing may be generated by the video editing application. For example, the video editing application may obtain the set of framing for the video and generate the reduced set of framing for the video. The video editing application may allow the user to see, use, and/or change the set of framing and/or the reduced set of framing. User changes to the framing of the visual content may change the set of framing and/or the reduced set of framing. User changes to the framing of the visual content may change the set of framing or the reduced set of framing based on which of the set/reduced set are being used/presented. For example, a graphical user interface may include visual representations of the set of framing or the reduced set of framing. The graphical user interface may include option(s) for user to switch between the set of framing or the reduced set of framing. The user may interact with the graphical user interface/visual representations to change the framings (e.g., add a new framing, remove an existing framing, modify an existing framing). Based on the graphical user interface including visual representations of the set of framing, user changes to the framings may be made to the set of framing. Based on the graphical user interface including visual representations of the reduced set of framing, user changes to the framings may be made to the reduced set of framing.

In some implementations, provision of the reduced set of framing for the video for use in generating the presentation of the video may include presentation of one or more graphical user interfaces on one or more electronic displays. A graphical user interface may refer to a user interface that enables a user to interact with the system 10. A graphical user interface may refer to a user interface that enables the system 10 to provide information to a user. A graphical user interface may include interface elements. An interface element may refer to a graphical element of the user interface, such as window, icon, button, graphic, and/or other visual indicator. An interface element may visually provide information and/or enable a user to provide inputs to the system 10. For example, an interface element may visually provide information determined by the system 10 and/or a user may interact (e.g., engage, toggle, manipulate) with an interface element to provide one or more input to the system 10. The graphical user interface(s) may provide options and/or enable a user to provide input to change the framing of the visual content of the video, generate the presentation of the video, generate/modify one or more video edits including the video, and/or otherwise interact with the video.

The graphical user interface(s) may include framing-marker elements to represent framings of the visual content within the reduced set of framing for the video and/or the set of framing for the video. A framing-marker element may refer to an interface element that visually represents a framing of the visual content at a corresponding moment within the progress length of the video. A framing-marker element may be presented on and/or adjacent to a portion of a timeline element/timeline representation that represents the corresponding moment. The timeline element/timeline representation may represent the entire progress length of the video or a portion of the progress length of the video. The location of the framing-marker element on the timeline element/timeline representation may correspond to the corresponding moment. For example, one framing-marker element may be presented at a particular location on the timeline element/timeline representation to represent one framing of the visual content at one moment within the progress length, and another framing-marker element may be presented at another location on the timeline element/timeline representation to represent another framing of the visual content at another moment within the progress length.

The framing-marker elements may be modifiable within the graphical user interface(s) to change the framings of the visual content within the reduced set of framing for the video and/or the set of framing for the video. Changing the framings of the visual content may include changing the positioning of the viewing window defined by the framings of the visual content. For example, the framings of the visual content may be changed via user interaction with the graphical user interface(s) change viewing direction, viewing size, viewing rotation, and/or viewing projection of the viewing window at the corresponding moments.

The graphical user interface(s) may further include a framing number element. The framing number element may enable user control of the number of framing of the visual content within the reduced set of framing for the video. The framing number element may enable the user to set the number of framings of the visual content within the reduced set of framing of the video. The framing number element may enable the user to increase or decrease the number of framings of the visual content within the reduced set of framing of the video.

The framing number element may enable user control of the number of framing of the visual content presented within the graphical user interface(s). The framing number element may enable the user to set the number of framings of the visual content presented within the graphical user interface(s). The framing number element may enable the user to increase or decrease the number of framings of the visual content presented within the graphical user interface(s).

Figure 5A:
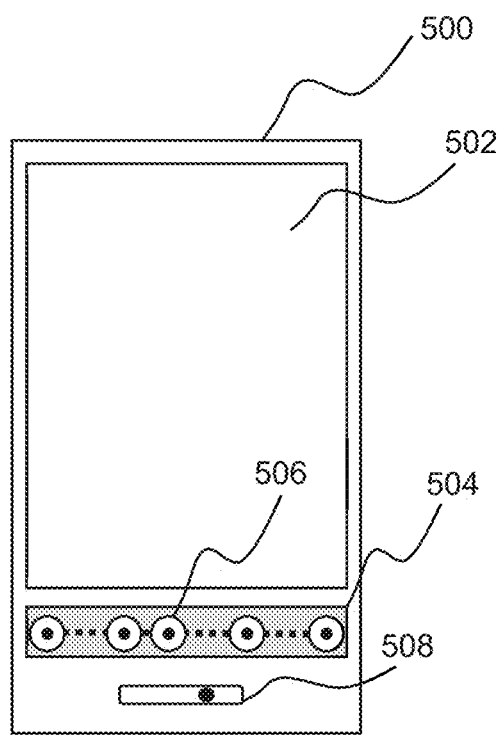
FIG. 5A illustrates an example graphical user interface.
Figure 5B:
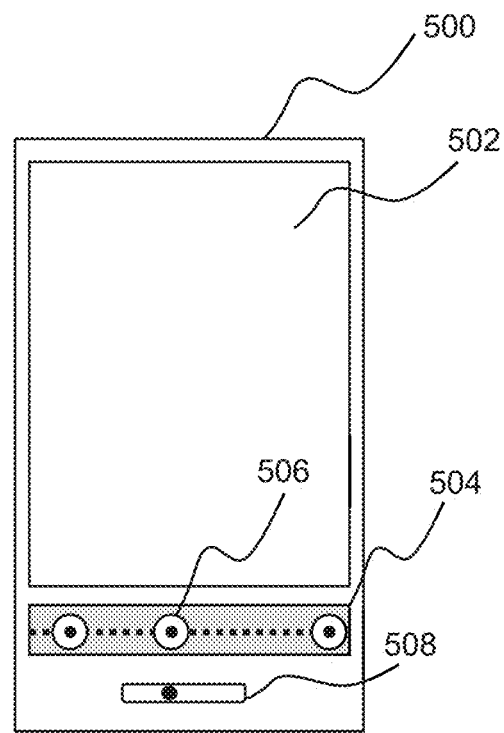
FIG. 5B illustrates an example graphical user interface.

FIGS. 5A and 5B illustrates an example graphical user interface 500. The graphical user interface 500 is provided merely as an example and is not meant to be limiting. The arrangement and visual aspects of the graphical user interfaces and the layout of media items may vary depending on the implementation. The graphical user interfaces may include additional features and/or alternative features. The graphical user interface may not include features shown in FIGS. 5A and 5B. Other types and configurations of graphical user interfaces are contemplated.

The graphical user interface 500 may include a playback section 502. The playback section 502 may present a playback of the visual content of the video, with the extent of the visual content within the viewing window being punched out for the playback. The graphical user interface 500 may include a bar 504 that represents/includes representation of the progress length of the video. Framing-marker elements 506 may be positioned along the bar 504. Individual ones of the framing-marker element 506 may represent individual framing of the visual content of the video. The location of the framing-marker elements 506 along the bar 504 may represent the moment corresponding to the framings. For example, FIG. 5A may show five framing-marker elements representing framings at five different moments within the progress length of the video.

A user may interact with the graphical user interface 500 to change the framing of the visual content. For example, a user may interact with the framing-marker elements 506 to remove or modify an existing framing of the visual content. A user may interact with the graphical user interface 500 to add a new framing of the visual content, and a new framing-marker element may appear along the bar 504.

The graphical user interface 500 may include a framing number element 508. A user may interact with the framing number element 508 to change the number of framing of the visual content for the video (e.g., change the number of framing in the reduced set of framing). A user may interact with the framing number element 508 to change the number of framing of the visual content presented within the graphical user interface 500. For example, the framing number element 508 may include a slider. A user may move the slider to change the number of framing for the video and/or the number of framing presented within the graphical user interface 500. For example, moving the slider to the right may increase the number of framings for the video and/or the number of framings presented within the graphical user interface 500. Moving the slider to the left may decrease the number of framings for the video and/or the number of framing presented within the graphical user interface 500. In some implementations, the framing number element 508 may control the number of framing for the entire progress length of the video. In some implementations, the framing number element 508 may control the number of framing for one or more portions of the progress length of the video. In some implementations, the framing number element 508 may control smoothing of the viewing path for the video. For example, the framing number element 508 may set, increase, and/or decrease the amount by which the viewing path for the video is smoothed.

While FIGS. 5A and 5B shows the framing number element 508 as a slider, this is merely as an example and is not meant to be limiting. Other types and configurations of framing number element are contemplated.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
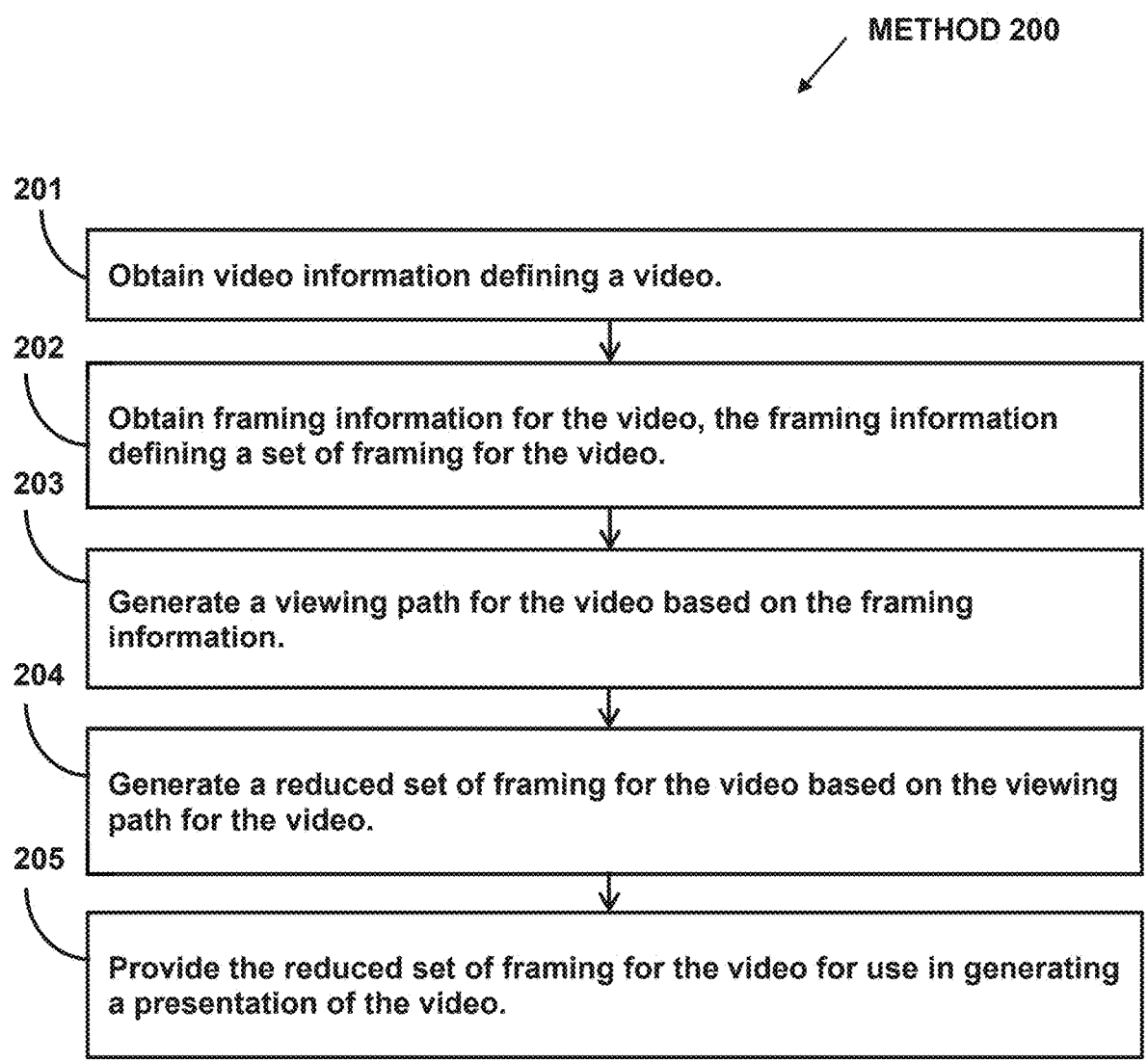
FIG. 2 illustrates a method for reducing the number of video framing.

FIG. 2 illustrates method 200 for reducing the number of video framing. The operations of method 200 presented below are intended to be illustrative. In some implementations, method 200 may be accomplished with one or more additional operations not described, and/or without one or more of the operations discussed. In some implementations, two or more of the operations may occur simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operations of method 200.

Referring to FIG. 2 and method 200, at operation 201, video information may be obtained. The video information may define a video. The video may include video content having a progress length. The video content may include visual content viewable as a function of progress through the progress length. The visual content may have a field of view. In some implementations, operation 201 may be performed by a processor component the same as or similar to the video component 102 (Shown in FIG. 1 and described herein).

At operation 202, framing information for the video may be obtained. The framing information for the video may define a set of framing for the video. The set of framing for the video may include multiple framings of the visual content at multiple moments within the progress length. An individual framing of the visual content may define a positioning of a viewing window within the field of view of the visual content at a corresponding moment within the progress length. The viewing window may define extents of the visual content to be included within a presentation of the video. In some implementations, operation 202 may be performed by a processor component the same as or similar to the framing component 104 (Shown in FIG. 1 and described herein).

At operation 203, a viewing path for the video may be generated based on the framing information and/or other information. The viewing path may define the positioning of the viewing window within the field of view of the visual content as the function of progress through the progress length. In some implementations, operation 203 may be performed by a processor component the same as or similar to the viewing path component 106 (Shown in FIG. 1 and described herein).

At operation 204, a reduced set of framing for the video may be generated based on the viewing path for the video and/or other information. The reduced set of framing for the video may include fewer number of framings of the visual content than the set of framing for the video. In some implementations, operation 204 may be performed by a processor component the same as or similar to the reduced framing component 108 (Shown in FIG. 1 and described herein).

At operation 205, the reduced set of framing for the video may be provided for use in generating the presentation of the video. In some implementations, operation 205 may be performed by a processor component the same as or similar to the provision component 110 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for reducing number of video framing, the system comprising:
    one or more physical processors configured by machine-readable instructions to:
        obtain video information defining a video, the video including video content having a progress length, the video content including visual content viewable as a function of progress through the progress length, the visual content having a field of view;
        obtain framing information for the video, the framing information defining a set of framing for the video, the set of framing for the video including multiple framings of the visual content at multiple moments within the progress length, an individual framing of the visual content defining a positioning of a viewing window within the field of view of the visual content at a corresponding moment within the progress length, the viewing window defining extents of the visual content to be included within a presentation of the video;
        generate a viewing path for the video based on the framing information, the viewing path defining the positioning of the viewing window within the field of view of the visual content as the function of progress through the progress length;
        generate a reduced set of framing for the video based on the viewing path for the video, the reduced set of framing for the video including fewer number of framings of the visual content than the set of framing for the video, wherein generation of the reduced set of framing for the video based on the viewing path for the video includes:
            generation of a smoothed viewing path for the video from the viewing path for the video;
            identification of points on the smoothed viewing path that define the smoothed viewing path; and
            generation of the reduced set of framing for the video based on the identified points on the smoothed viewing path that define the smoothed viewing path; and
        provide the reduced set of framing for the video for use in generating the presentation of the video, wherein provision of the reduced set of framing for the video for use in generating the presentation of the video includes:
            usage of the reduced set of framing for the video to generate the presentation of the video; or
            presentation of a graphical user interface on an electronic display, the graphical user interface including framing-marker elements to represent framings of the visual content within the reduced set of framing for the video.

2. The system of claim 1, wherein:
    the framing-marker elements are modifiable within the graphical user interface to change the framings of the visual content within the reduced set of framing for the video; and
    the graphical user interface further includes a framing number element, the framing number element enabling user control of a number of framing of the visual content within the reduced set of framing for the video.

3. A system for reducing number of video framing, the system comprising:
    one or more physical processors configured by machine-readable instructions to:
        obtain video information defining a video, the video including video content having a progress length, the video content including visual content viewable as a function of progress through the progress length, the visual content having a field of view;
        obtain framing information for the video, the framing information defining a set of framing for the video, the set of framing for the video including multiple framings of the visual content at multiple moments within the progress length, an individual framing of the visual content defining a positioning of a viewing window within the field of view of the visual content at a corresponding moment within the progress length, the viewing window defining extents of the visual content to be included within a presentation of the video;
        generate a viewing path for the video based on the framing information, the viewing path defining the positioning of the viewing window within the field of view of the visual content as the function of progress through the progress length;
        generate a reduced set of framing for the video based on the viewing path for the video, the reduced set of framing for the video including fewer number of framings of the visual content than the set of framing for the video; and
        provide the reduced set of framing for the video for use in generating the presentation of the video.

4. The system of claim 3, wherein the framing information for the video is obtained based on a user's interaction with a mobile device.

5. The system of claim 3, wherein the framing information for the video is obtained based on tracking of a thing depicted within the visual content.

6. The system of claim 3, wherein the video content further includes audio content, and the framing information for the video is obtained based on direction of the audio content.

7. The system of claim 3, wherein generation of the reduced set of framing for the video based on the viewing path for the video includes:
   generation of a smoothed viewing path for the video from the viewing path for the video;
   identification of points on the smoothed viewing path that define the smoothed viewing path; and
   generation of the reduced set of framing for the video based on the identified points on the smoothed viewing path that define the smoothed viewing path.

8. The system of claim 3, wherein provision of the reduced set of framing for the video for use in generating the presentation of the video includes usage of the reduced set of framing for the video to generate the presentation of the video.

9. The system of claim 3, wherein provision of the reduced set of framing for the video for use in generating the presentation of the video includes presentation of a graphical user interface on an electronic display, the graphical user interface including framing-marker elements to represent framings of the visual content within the reduced set of framing for the video.

10. The system of claim 9, wherein the framing-marker elements are modifiable within the graphical user interface to change the framings of the visual content within the reduced set of framing for the video.

11. The system of claim 9, wherein the graphical user interface further includes a framing number element, the framing number element enabling user control of a number of framing of the visual content within the reduced set of framing for the video.

12. A method for reducing number of video framing, the method performed by a computing system including one or more processors, the method comprising:
   obtaining, by the computing system, video information defining a video, the video including video content having a progress length, the video content including visual content viewable as a function of progress through the progress length, the visual content having a field of view;
   obtaining, by the computing system, framing information for the video, the framing information defining a set of framing for the video, the set of framing for the video including multiple framings of the visual content at multiple moments within the progress length, an individual framing of the visual content defining a positioning of a viewing window within the field of view of the visual content at a corresponding moment within the progress length, the viewing window defining extents of the visual content to be included within a presentation of the video;
   generating, by the computing system, a viewing path for the video based on the framing information, the viewing path defining the positioning of the viewing window within the field of view of the visual content as the function of progress through the progress length;
   generating, by the computing system, a reduced set of framing for the video based on the viewing path for the video, the reduced set of framing for the video including fewer number of framings of the visual content than the set of framing for the video; and
   providing, by the computing system, the reduced set of framing for the video for use in generating the presentation of the video.

13. The method of claim 12, wherein the framing information for the video is obtained based on a user's interaction with a mobile device.

14. The method of claim 12, wherein the framing information for the video is obtained based on tracking of a thing depicted within the visual content.

15. The method of claim 12, wherein the video content further includes audio content, and the framing information for the video is obtained based on direction of the audio content.

16. The method of claim 12, wherein generating the reduced set of framing for the video based on the viewing path for the video includes:
   generating a smoothed viewing path for the video from the viewing path for the video;
   identifying points on the smoothed viewing path that define the smoothed viewing path; and
   generating the reduced set of framing for the video based on the identified points on the smoothed viewing path that define the smoothed viewing path.

17. The method of claim 12, wherein providing the reduced set of framing for the video for use in generating the presentation of the video includes using the reduced set of framing for the video to generate the presentation of the video.

18. The method of claim 12, wherein providing the reduced set of framing for the video for use in generating the presentation of the video includes presenting a graphical user interface on an electronic display, the graphical user interface including framing-marker elements to represent framings of the visual content within the reduced set of framing for the video.

19. The method of claim 18, wherein the framing-marker elements are modifiable within the graphical user interface to change the framings of the visual content within the reduced set of framing for the video.

20. The method of claim 18, wherein the graphical user interface further includes a framing number element, the framing number element enabling user control of a number of framing of the visual content within the reduced set of framing for the video.

* * * * *